United States Patent
Kim et al.

(10) Patent No.: US 12,462,392 B2
(45) Date of Patent: Nov. 4, 2025

(54) METHODS AND APPARATUSES FOR AUTO SEGMENTATION USING BOUNDING BOX

(71) Applicant: NUVI LABS CO., LTD., Incheon (KR)

(72) Inventors: Dae Hoon Kim, Seoul (KR); Jey Yoon Ru, Seoul (KR); Luca Pimenta Medeiros, Seoul (KR)

(73) Assignee: NUVI LABS CO., LTD., Incheon (KR)

( * ) Notice: Subject to any disclaimer, the term of this patent is extended or adjusted under 35 U.S.C. 154(b) by 384 days.

(21) Appl. No.: 18/090,408

(22) Filed: Dec. 28, 2022

(65) Prior Publication Data
US 2024/0161303 A1   May 16, 2024

(30) Foreign Application Priority Data
Nov. 4, 2022   (KR) .................. 10-2022-0145994

(51) Int. Cl.
*G06T 7/11* (2017.01)
*G06T 7/194* (2017.01)
*G06T 7/90* (2017.01)

(52) U.S. Cl.
CPC ............... *G06T 7/11* (2017.01); *G06T 7/194* (2017.01); *G06T 7/90* (2017.01); *G06T 2207/20081* (2013.01); *G06T 2207/20112* (2013.01)

(58) Field of Classification Search
None
See application file for complete search history.

(56) References Cited

U.S. PATENT DOCUMENTS

| 10,402,978 | B1* | 9/2019 | Kim ..................... G06T 7/11 |
| 10,692,002 | B1* | 6/2020 | Kim .................. G06V 20/58 |
| 2015/0071487 | A1* | 3/2015 | Sheng ................ G06F 16/50 382/103 |
| 2018/0189596 | A1* | 7/2018 | Lee .................. G06V 10/25 |
| 2022/0391616 | A1* | 12/2022 | Tsui .................. G06V 20/58 |
| 2023/0023164 | A1* | 1/2023 | Parameswaran ... G06V 10/7753 |
| 2023/0360238 | A1* | 11/2023 | Alexander ............ G06T 7/50 |

OTHER PUBLICATIONS

Tian et al., "BoxInst: High-Performance Instance Segmentation With Box Annotations", 2021, CVPR, pp. 5443-5452 (Year: 2021).*
Tian, Z. et al., "BoxInst: High-Performance Instance Segmentation With Box Annotations," arXiv (Cornell University), (2020).
Tian, Z. et al., "Conditional Convolutions for Instance Segmentation," arXiv (Cornell University), (2020).
Kirillov, A. et al., "Segment Anything," arXiv.org, (2023).
Extended European Search Report dated Apr. 12, 2024 as received in Application No. 23210773.0.

* cited by examiner

*Primary Examiner* — Edward Park
(74) *Attorney, Agent, or Firm* — Maschoff Brennan

(57) ABSTRACT

Provided are a method and an apparatus for auto segmentation using a bounding box. A method for auto segmentation using a bounding box according to one embodiment of the present disclosure comprises receiving a first object image including an object labeled with a bounding box, which is a pre-learning target, learning a segmentation model by classifying an object and a background from the bounding box of the received first object image, and segmenting an object from a second object image, which is an identification target, using the learned segmentation model.

15 Claims, 9 Drawing Sheets

METHODS AND APPARATUSES FOR AUTO SEGMENTATION USING BOUNDING BOX

CROSS-REFERENCE TO RELATED APPLICATIONS

This application claims benefit of priority to Korean Patent Application No. 10-2022-0145994 filed on 4 Nov. 2022 in the Korean Intellectual Property Office, the disclosure of which is incorporated herein by reference in its entirety.

TECHNICAL FIELD

The present disclosure relates to a method and apparatus for auto segmentation.

BACKGROUND ART

Recently, as more and more people want to maintain a healthy diet, such as a well-being diet, the demand for technology for identifying food and measuring the amount of food is increasing.

When the technology is used properly, even in places where meals are served to a plurality of people, such as schools, companies, military camps, government offices, and hospitals, types and amounts of food served to people may be measured, through which the amount of served and leftover food is measured. Accordingly, many advantageous effects may be obtained in that the amount of demand and supply may be predicted to realize the efficient management of food distribution, and the number of calories consumed by people may be managed.

However, since most current technologies use a food image taken through a camera for a simple image search, the search accuracy is considerably low. Moreover, since the accuracy of food type identification in the image search is low, a resulting error increases in the following steps, such as calorie counting.

Meanwhile, deep learning is being applied to image recognition to solve the problem above. However, the current deep learning technology has an inherent problem. Deep learning technology has emerged along with big data technology, which means that a large amount of data is required to learn a deep learning model. Manual labeling through human supervision is the naivest way to obtain data.

However, manual labeling is likely to cause a bias for each label due to differences in background knowledge and expertise of individual labelers and is time-consuming and costly.

On the other hand, if labeling is performed in the direction of utilizing prediction results obtained by inferring data through a deep learning model trained with a large amount of data rather than directly by human intervention, simple inspection of at least tens to hundreds of results and modification of only the necessary part will suffice to complete the labeling process, thereby considerably reducing the time cost.

It is clearly understood that a large amount of data is important for learning a model; however, once data are accumulated beyond a certain amount, data quality plays a more crucial role than the quantity of data. Rather than continually adding data that the model already predicts successfully, it is more helpful in improving the model's performance to learn the model using edge-case data for which the model does not provide a satisfactory prediction result.

Segmentation is partitioning an image into pixel segments, and a detector model that outputs a bounding box determines a Region of Interest (RoI) and guesses correctly only the class within that region.

In general, learning a segmentation model requires image data for which a class is assigned to each pixel value. In the case of a detector model predicting a bounding box, however, having as many labels as the number of objects in the image suffices.

Considering the number of clicks, since segmentation requires drawing polygons, overwhelmingly more clicks are needed than creating a bounding box that requires only the coordinates of the upper left and lower right corners. For this reason, more time and cost are required for labeling.

SUMMARY

Embodiments of the present disclosure are intended to provide a method and apparatus for auto segmentation using a bounding box, which segments an object labeled with a bounding box in an object image through weakly-supervised learning.

However, the technical problem to be solved by the present disclosure is not limited to the above but may be extended to other various problems belonging to the scope not departing from the technical principles and domain of the present disclosure.

According to one embodiment of the present disclosure, in a method for identifying an object executed by an apparatus for identifying an object, a method for auto segmentation executed by an apparatus for auto segmentation may provide a method for auto segmentation using a bounding box comprising receiving a first object image including an object labeled with a bounding box, which is a pre-learning target; learning a segmentation model by classifying an object and a background from the bounding box of the received first object image; and segmenting an object from a second object image, which is an identification target, using the learned segmentation model.

The learning a segmentation model may classify an object and a background using a color similarity map in a bounding box of the received first object image and learn the segmentation model through the classification of the object and the background.

The learning a segmentation model may learn the segmentation model by determining whether a pixel located in the bounding box of the received first object image belongs to one of objects to be trained or the background.

The learning a segmentation model may calculate a mask loss by summing a first loss calculated by using a mask and a bounding box predicted in the first object image and a second loss calculated by using a mask predicted in the first object image and a color similarity map between individual pixels and their neighboring pixels within the bounding box and learn the segmentation model using the calculated mask loss.

The learning a segmentation model may calculate a first loss so that the prediction mask is restricted to stay within the bounding box.

The learning a segmentation model may calculate a second loss so that an area occupied by the prediction mask contains the minimum of a background area and the maximum of an object area.

The method may further include performing auto-labeling in a manner of re-training through user inspection for a bounding box exceeding a preset prediction error value.

The identifying an object from a second object image may identify an object from the second object image, which is an identification target, using the learned segmentation model and a pre-learned multimodal model.

Meanwhile, according to another embodiment of the present disclosure, an apparatus for auto segmentation using a bounding box may be provided, the apparatus comprising a database storing a first object image including an object labeled with a bounding box, which is a pre-learning target; a memory storing one or more programs; and a processor executing the stored one or more programs, wherein the processor is configured to receive a first object image including an object labeled with a bounding box, which is a pre-learning target, learn a segmentation model by classifying an object and a background from the bounding box of the received first object image, and segment an object from a second object image, which is an identification target, using the learned segmentation model.

The processor may classify an object and a background using a color similarity map in a bounding box of the received first object image and learn the segmentation model through the classification of the object and the background.

The processor may learn the segmentation model by determining whether a pixel located in the bounding box of the received first object image belongs to one of objects to be trained or the background.

The processor may calculate a mask loss by summing a first loss calculated by using a mask and a bounding box predicted in the first object image and a second loss calculated by using a mask predicted in the first object image and a color similarity map between individual pixels and their neighboring pixels within the bounding box and learn the segmentation model using the calculated mask loss.

The processor may calculate a first loss so that the prediction mask is restricted to stay within the bounding box.

The processor may calculate a second loss so that an area occupied by the prediction mask contains the minimum of a background area and the maximum of an object area.

The processor may perform auto-labeling in a manner of re-training through user inspection for a bounding box exceeding a preset prediction error value.

The processor may identify an object from the second object image, which is an identification target, using the learned segmentation model and a pre-learned multimodal model.

The present disclosure may provide the following effects. However, since it is not meant that a specific embodiment has to provide all of or only the following effects, the technical scope of the present disclosure should not be regarded as being limited by the specific embodiment.

Embodiments of the present disclosure may segment an object labeled with a bounding box in an object image through weakly-supervised learning.

Embodiments of the present disclosure may learn a segmentation model using only bounding box labels based on color similarity.

Embodiments of the present disclosure may perform auto-labeling by re-learning wrongly predicted or spurious cases through inspection rather than performing segmentation labeling.

Embodiments of the present disclosure may easily classify thousands of objects simply by determining whether a corresponding pixel belongs to one of the objects to be trained or a background.

DESCRIPTION OF EXEMPLARY EMBODIMENTS

Figure 1:
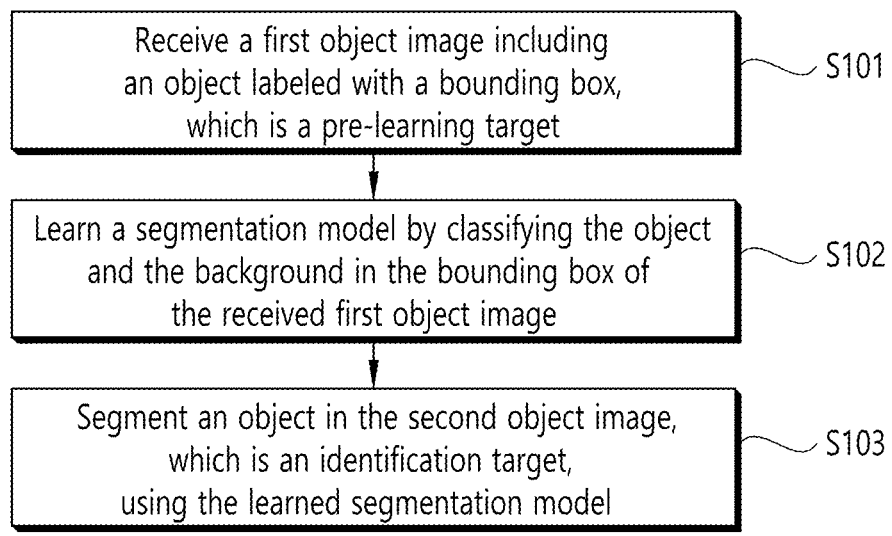
FIG. 1 is a flow diagram illustrating a method for auto segmentation using a bounding box according to one embodiment of the present disclosure.

Since the present disclosure may be modified in various ways and may provide various embodiments, specific embodiments will be depicted in the appended drawings and described in detail with reference to the drawings. However, it should be understood that the specific embodiments are not intended to limit the gist of the present disclosure; rather, it should be understood that the specific embodiments include all of the modifications, equivalents, or alternatives belonging to the technical principles and scope of the present disclosure. In describing the present disclosure, if it is determined that a detailed description of a related art incorporated herein unnecessarily obscure the gist of the present disclosure, the detailed description thereof will be omitted.

Terms such as "first" and "second" may be used to describe various constituting elements, but the constituting elements should not be limited by the terms. The terms are introduced to distinguish one element from the others.

The technical terms used in the present disclosure have been introduced solely for the purpose of describing a specific embodiment, and it should be noted that the terms are not intended to restrict the technical scope of the present disclosure. Terms used in the present disclosure have been selected as much as possible from general terms relevant to the functions of the present disclosure and currently in wide use; however, the selection of terms may be varied depending on the intention of those persons skilled in the corresponding field, precedents, or emergence of new technologies. Also, in a particular case, some terms may be selected arbitrarily by the applicant, and in this case, detailed definitions of the terms will be provided in the corresponding description of the present disclosure. Therefore, the terms used in the present disclosure should be defined not simply by their apparent name but based on their meaning and context throughout the present disclosure.

It should be understood that the singular expression includes the plural expression unless the context clearly indicates otherwise. In the present disclosure, the terms "comprises" or "have" specify the presence of stated features, numerals, steps, operations, components, parts, or a combination thereof, but do not preclude the presence or addition of one or more other features, numerals, steps, operations, components, parts, or a combination thereof.

In the embodiments of the present disclosure, an object represents an entity that exists in the real world, which may be captured by a camera and recognized. For example, objects may include food in a soup kitchen or restaurant, food in a cafeteria or supermarket, general objects, and means of transportation.

In what follows, embodiments of the present disclosure will be described in detail with reference to appended drawings. Throughout the specification, the same or corresponding constituting element is assigned the same reference number, and repeated descriptions thereof will be omitted.

FIG. 1 is a flow diagram illustrating a method for auto segmentation using a bounding box according to one embodiment of the present disclosure.

As shown in FIG. 1, in the S101 step, an apparatus for auto segmentation using a bounding box according to one embodiment of the present disclosure receives a first object image including an object labeled with a bounding box, which is a pre-learning target.

In the S102 step, the apparatus for auto segmentation learns a segmentation model by segmenting an object in the bounding box through the classification of the object and the background in the bounding box of the received first object image.

In the S103 step, the apparatus for auto segmentation segments an object in the second object image, which is an identification target, using the learned segmentation model.

After that, the apparatus for auto segmentation may perform auto-labeling in a manner of re-training through user inspection for a bounding box exceeding a preset prediction error value.

Also, the apparatus for auto segmentation may identify an object from the second object image using a learned segmentation model. Here, the apparatus for auto segmentation may identify an object from the second object image using the learned segmentation model and a pre-learned multi-modal model.

Meanwhile, the apparatus for auto segmentation using a bounding box according to one embodiment of the present disclosure performs an object segmentation operation as a first step and a multimodal classification operation as a second step.

First, the object segmentation operation is described. The apparatus for auto segmentation may segment an object from the second object image using a segmentation model. The segmentation model used by the apparatus for auto segmentation is a weakly-supervised model in which segmentation is performed through the data labeled with a bounding box (e.g., a first object image).

It is assumed that when there is an object, which is a pre-learning target or an identification target (e.g., an object in the first object image), within a given bounding box, the similarity between the background and the object is considerably low in terms of color level. Based on the assumption, the apparatus for auto segmentation may learn object segmentation from the first object image labeled with a bounding box by utilizing the color similarity.

The apparatus for auto segmentation extracts a segmentation result from new data (e.g., a second object image including an object to be identified) by utilizing a segmentation model trained using the first object image labeled only with the bounding box. The apparatus for auto segmentation may perform auto-labeling by re-learning wrongly predicted or spurious cases through inspection rather than performing segmentation labeling by the user.

The apparatus for auto segmentation performs the following two optimization processes to learn object segmentation using a bounding box.

First, the apparatus for auto segmentation restricts a target object to always exist only inside the bounding box. The apparatus for auto segmentation restricts the width and height obtained through predicted values from segmentation not to be greater than the given bounding box.

Second, based on the assumption that a target object has a similar color, the apparatus for auto segmentation learns the segmentation model by assigning the pixels with similar colors to the same label after transforming the object into the LAB color space.

Here, the apparatus for auto segmentation may save inspection time by learning wrongly predicted or spurious cases, namely, estimating uncertainty. The apparatus for auto segmentation may not only present a simple segmentation result from an object image but also predict the accuracy of the segmentation result. The accuracy of the segmentation results may measure confidence in the segmentation result.

The apparatus for auto segmentation automatically performs segmentation in the bounding box of the received first object image. The apparatus for auto segmentation may calculate the difficulty level of a segmentation task, determine whether a user inspection is required for the segmentation task, and request intervention from the user. Through the operation, the apparatus for auto segmentation requests inspection from the user only when segmentation is spurious, and as a result, the amount of work required for human inspection may be reduced.

The apparatus for auto segmentation device may segment an object in the bounding box through the classification of the object and the background in the bounding box of the received first object image but may classify the segmentation result as certain or uncertain based on the uncertainty estimation result of the segmentation model. The user may check only the second object image classified as uncertain while not inspecting the first object image classified as certain. As a result, since the user should check a smaller number of data, the segmentation cost is reduced.

Also, the apparatus for auto segmentation has to classify objects from thousands of object images. Therefore, since it is difficult to perform segmentation immediately on an object image, the apparatus for auto segmentation may determine whether a corresponding pixel belongs to one of the objects to be trained or the background through a segmentation model. As a modified example, the apparatus for auto segmentation may determine whether a corresponding pixel belongs to one of the objects to be trained or the background within a labeled bounding box in the object image, not within the entire object image. Also, the apparatus for auto segmentation may determine whether a corresponding pixel belongs to one of the objects to be trained or the background within a partially cropped object image, not the entire image.

Meanwhile, an embodiment of the present disclosure may provide a service for calculating the volume of each object. At this time, since the same object may have various names, if a specifically determined number of objects are classified, the classification may not be performed accurately when a new object is introduced. It isn't easy to learn these objects in pixel units. On the other hand, it is much easier to cut an object image in the segmentation area and classify the type of the corresponding object image.

As described above, the classification task may be made simpler through conversion from pixel units to image levels; however, since the number of classes is still undetermined, a general classification model has to undergo a new learning process each time a new class is added. In this case, if several to dozens of new names are added every day, the corresponding objects may not be inferred, and a human operator has to perform manual labeling rather than auto-labeling through a model.

To solve the problem above, the apparatus for auto segmentation according to an embodiment of the present disclosure may identify an object of the second object image by using a learned segmentation model and a pre-learned multimodal model.

Alternatively, the apparatus for auto segmentation according to an embodiment of the present disclosure may identify an object of the second object image using a class list generated through a learned segmentation model, a pre-learned multimodal model, and a preset menu list.

For example, the apparatus for auto segmentation according to an embodiment of the present disclosure may receive menus from a manager or a corresponding restaurant and classify objects in the object image only within the corresponding menus, thereby improving classification accuracy. Through the operation above, it is possible to reduce the inspection cost for labeling performed on object images.

Figure 2:
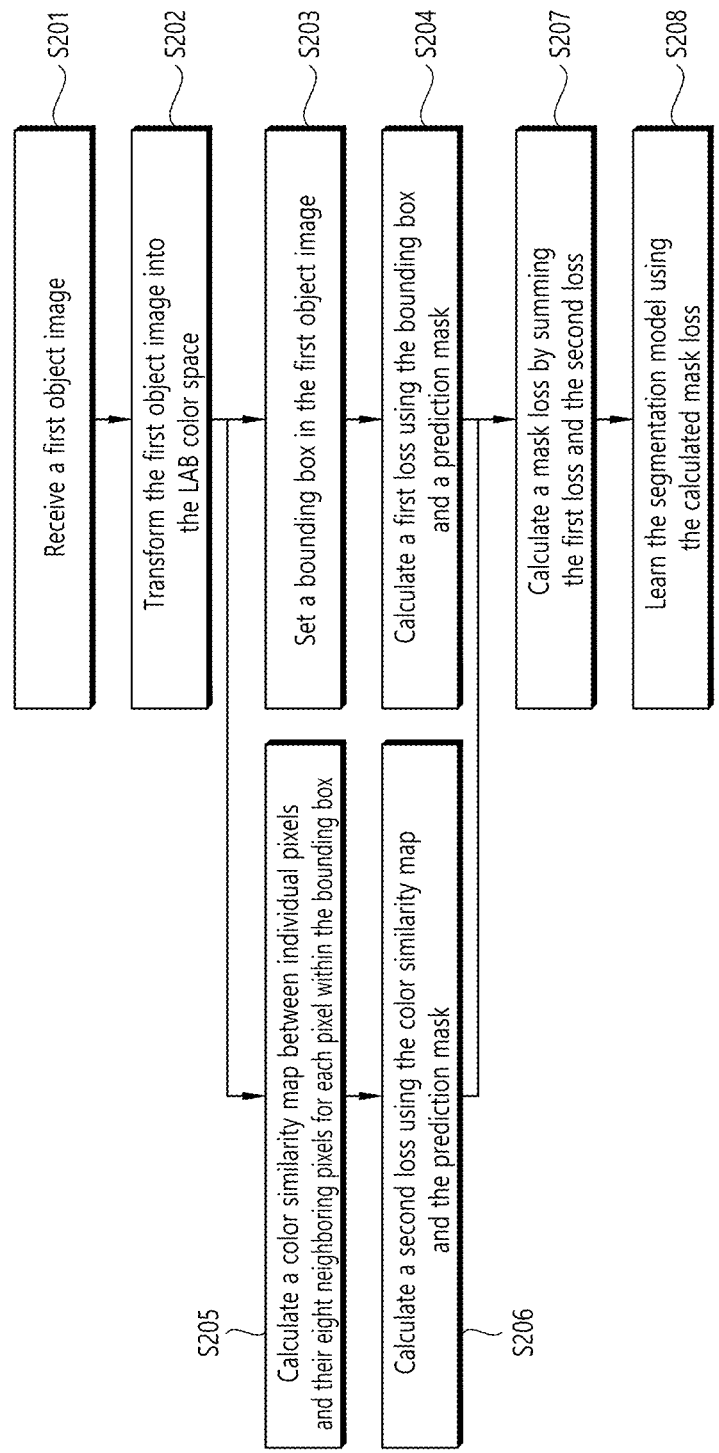
FIG. 2 is a flow diagram illustrating an operation of learning a segmentation model according to one embodiment of the present disclosure.

FIG. 2 is a flow diagram illustrating an operation of learning a segmentation model according to one embodiment of the present disclosure.

As shown in FIG. 2, in the S201 step, the apparatus for auto segmentation using a bounding box according to one embodiment of the present disclosure receives a first object image including an object labeled with a bounding box, which is a pre-learning target.

In the S202 step, the apparatus for auto segmentation transforms the first object image into the LAB color space.

In the S203 step, the apparatus for auto segmentation sets a bounding box in the first object image.

In the S204 step, the apparatus for auto segmentation calculates a first loss using the bounding box and a prediction mask.

In the S205 step, the apparatus for auto segmentation calculates a color similarity map between individual pixels and their eight neighboring pixels for each pixel within the bounding box.

In the S206 step, the apparatus for auto segmentation calculates a second loss using the color similarity map and the prediction mask.

In the S207 step, the apparatus for auto segmentation calculates a mask loss by summing the first loss and the second loss.

In the S208 step, the apparatus for auto segmentation learns the segmentation model using the calculated mask loss.

Figure 3:
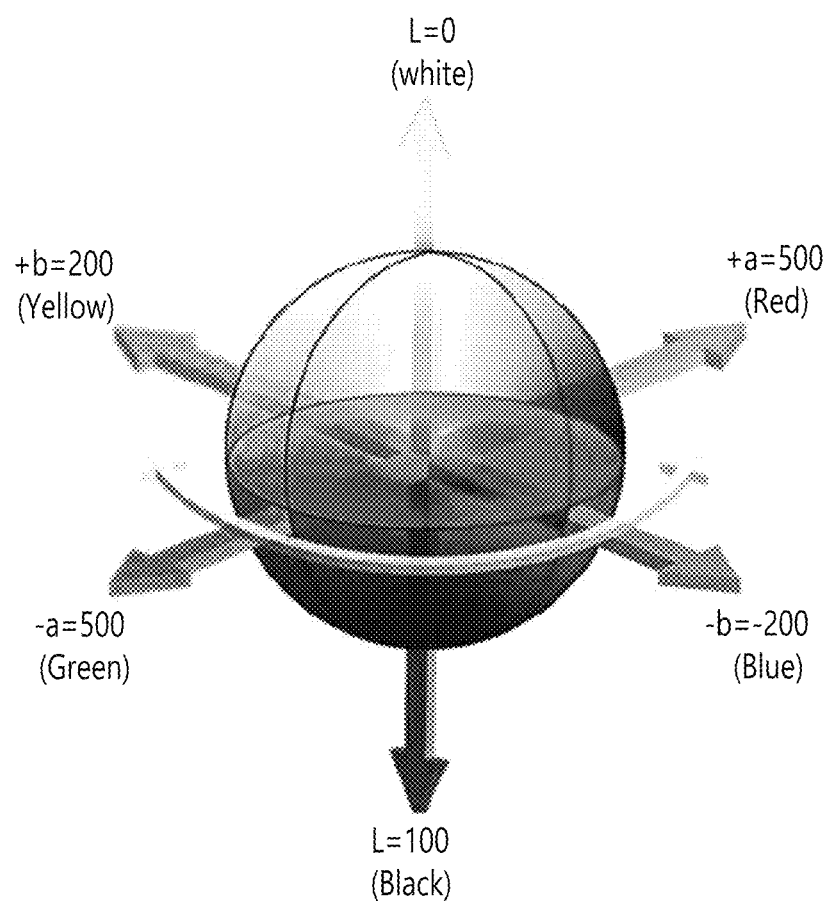
FIG. 3 illustrates the LAB space used for the operation of calculating color similarity applied to one embodiment of the present disclosure.

FIG. 3 illustrates the LAB space used for the operation of calculating color similarity applied to one embodiment of the present disclosure.

The apparatus for auto segmentation first transforms an object image into the LAB color space for color similarity calculation. Unlike the RGB color space, the LAB color space may express more color spaces and provides consistent color values because the LAB color space is independent of a photographing device.

The color similarity simply utilizes the difference between pixels.

$$S_e = S(c_{(i,j)}, c_{(l,k)}) = \exp\left(-\frac{\|c_{i,j} - c_{l,k}\|}{\theta}\right)$$

In the equation above, the value of $\theta$ is a hyper-parameter, for which a specific value may be used (e.g., 2). In the equation above, $S_e$ represents the color similarity of an edge e; $c_{i,j}$ and $c_{l,k}$ represent the color vectors of two pixels at (i,j) and (l,k), respectively.

The apparatus for auto segmentation may check how a segmentation model with mask labeling is trained.

Assuming that each masked pixel is a node of an undirected graph, and a virtual line E connects the pixels, the graph may be denoted as G=(V,E).

At this time, when line e connects the virtual pixels a and b, and a and b are assigned the same label (background or foreground), the label of the corresponding edge may be set to 1, and the segmentation model may be regarded as learning whether the edge is connected or not.

At this time, a segmentation model with only bounding box labeling has no edges to be learned, and this feature is used for training through the assumption that pixels of similar color levels have the same label value.

Given pixels at (i,j) and (l,k), and a value $m_{(i,j)}$ predicted by the segmentation model represents the probability that each pixel belongs to the foreground, the probability that the pixels at (i,j) and (l,k) have the same label may be expressed as follows.

$$P(y_e=1) = m_{(i,j)} * m_{(l,k)} + (1-m_{(i,j)}) * (1-m_{(l,k)})$$

In the equation above, $y_e$ is defined as the label of edge e. Here, $y_e=1$ means that two pixels connected by an edge have the same label, while $y_e=0$ means that two pixels connected by an edge have different labels.

Utilizing the color similarity as a threshold, the segmentation model learns whether each edge should be positive or negative.

Figure 4:
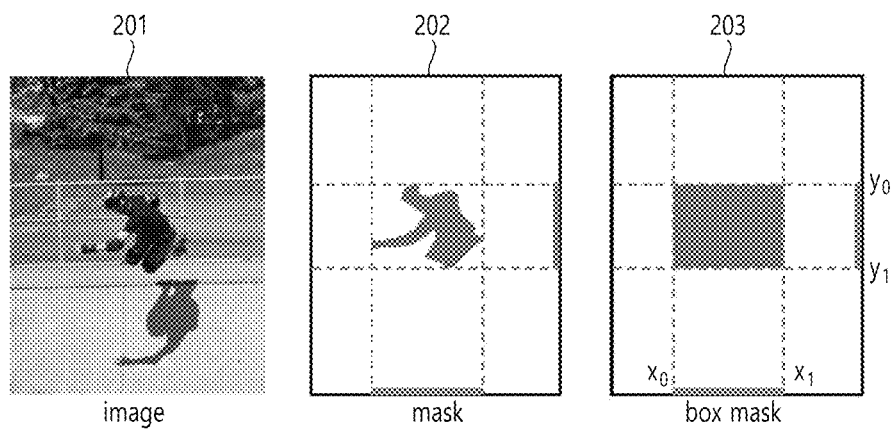
FIGS. 4 and 5 illustrate examples of the operation of calculating a first loss and a second loss according to another embodiment of the present disclosure.
Figure 5:
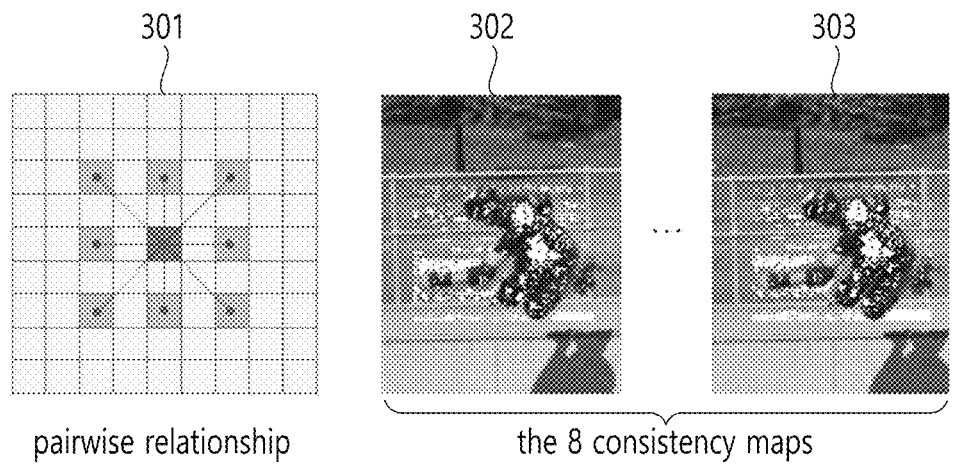

FIGS. 4 and 5 illustrate examples of the operation of calculating a first loss and a second loss according to another embodiment of the present disclosure.

The apparatus for auto segmentation according to one embodiment of the present disclosure uses a first loss and a second loss during the process of learning a segmentation model only through a bounding box. Here, the first loss may be a projection loss, and the second loss may be a pixel pairwise loss.

Regarding the projection loss, FIG. 4 shows object image 201 as a learning target, image 202 from the projection of a predicted mask, and image 203 from the project of a bounding box. The apparatus for auto segmentation restricts the predicted segmentation mask not to leave the bounding box given together during learning. In other words, the apparatus for auto segmentation prevents the prediction of a segmentation model from leaving the bounding box area in which an object is expected to exist.

Regarding the pixel pairwise loss, FIG. 5 shows a pixel pairwise relationship 301 between each pixel and its neighboring pixels and eight consistency maps 302, 303.

In what follows, the pixel pairwise loss is described. Based on the coordinates (i,j) and (l,k), a segmentation model may predict the probability that pixels at the corresponding coordinates of the prediction masks, which are prediction values, belong to the foreground. The corresponding values, $m_{(i,j)}$ and $m_{(l,k)}$ represent the probabilities predicted by the segmentation model that pixels at the corresponding coordinates belong to the foreground (where the foreground includes an object in this case). The probability that the coordinates (i,j) and (l,k) have the same label is $P(y_e=1)$, which is defined as follows.

$$P(y_e=1)=m_{(i,j)}*m_{(l,k)}+(1-m_{(i,j)})*(1-m_{(l,k)})$$

In other words, the probability $P(y_e=1)$ is obtained by adding the product of foreground probabilities and the product of background probabilities.

Here, if the two coordinates are assigned the same label, the probability of foreground or background is calculated as a high value. Conversely, if the two coordinates are given different labels, the probabilities of background and foreground are calculated as low values.

The equation of pixel pairwise loss is defined as follows from the corresponding probability formula.

$$L_{pairwise}=\Sigma_{e\in E_{in}}-\hat{y}_e \log P(\hat{y}_e=1)-(1-\hat{y}_e) \log P(\hat{y}_e=0)$$

Here, $-\log P(y_e=1)$ has a lower value as $P(y_e=1)$ gets closer to 1. If the equation is modified to $-\log P(y_e=0) \rightarrow -\log(1-P(y_e=1))$, $-\log(1-P(y_e=1))$ has a higher value as $P(y_e=1)$ gets closer to 1.

Therefore, as the apparatus for auto segmentation may learn a segmentation model that extracts pixels with the same label (foreground and background) by learning in the direction of decreasing the pixel pairwise loss $L_{pairwise}$ expressed as a sum of two products.

Here, since the pixel pairwise loss restricts the learning direction that returns a high probability value to be only inside the bounding box, the apparatus for auto segmentation may finally learn the segmentation model that extracts pixels having the same label (foreground=object).

Figure 6:
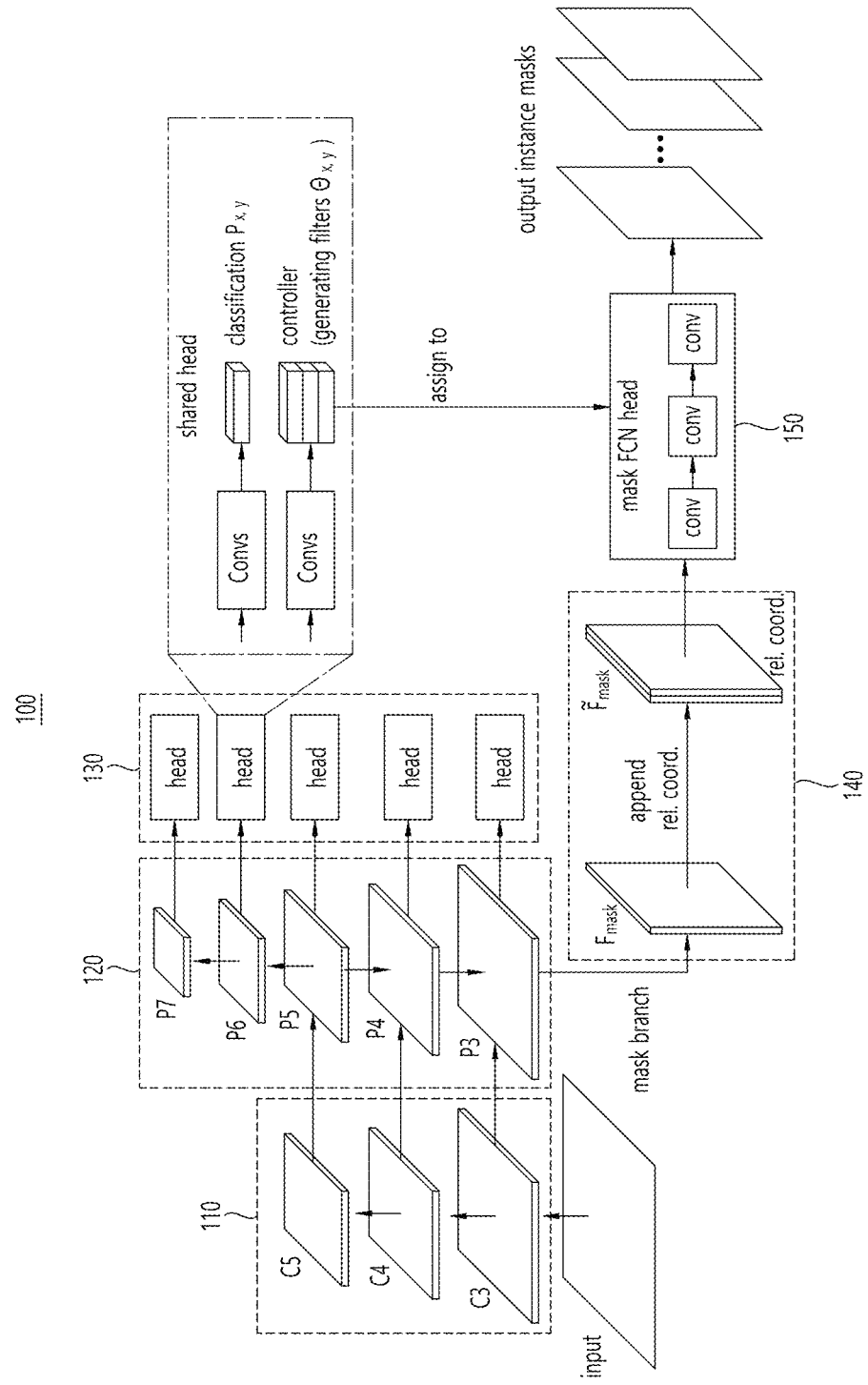
FIGS. 6 and 7 illustrate a segmentation model in an apparatus for auto segmentation according to one embodiment of the present disclosure.
Figure 7:
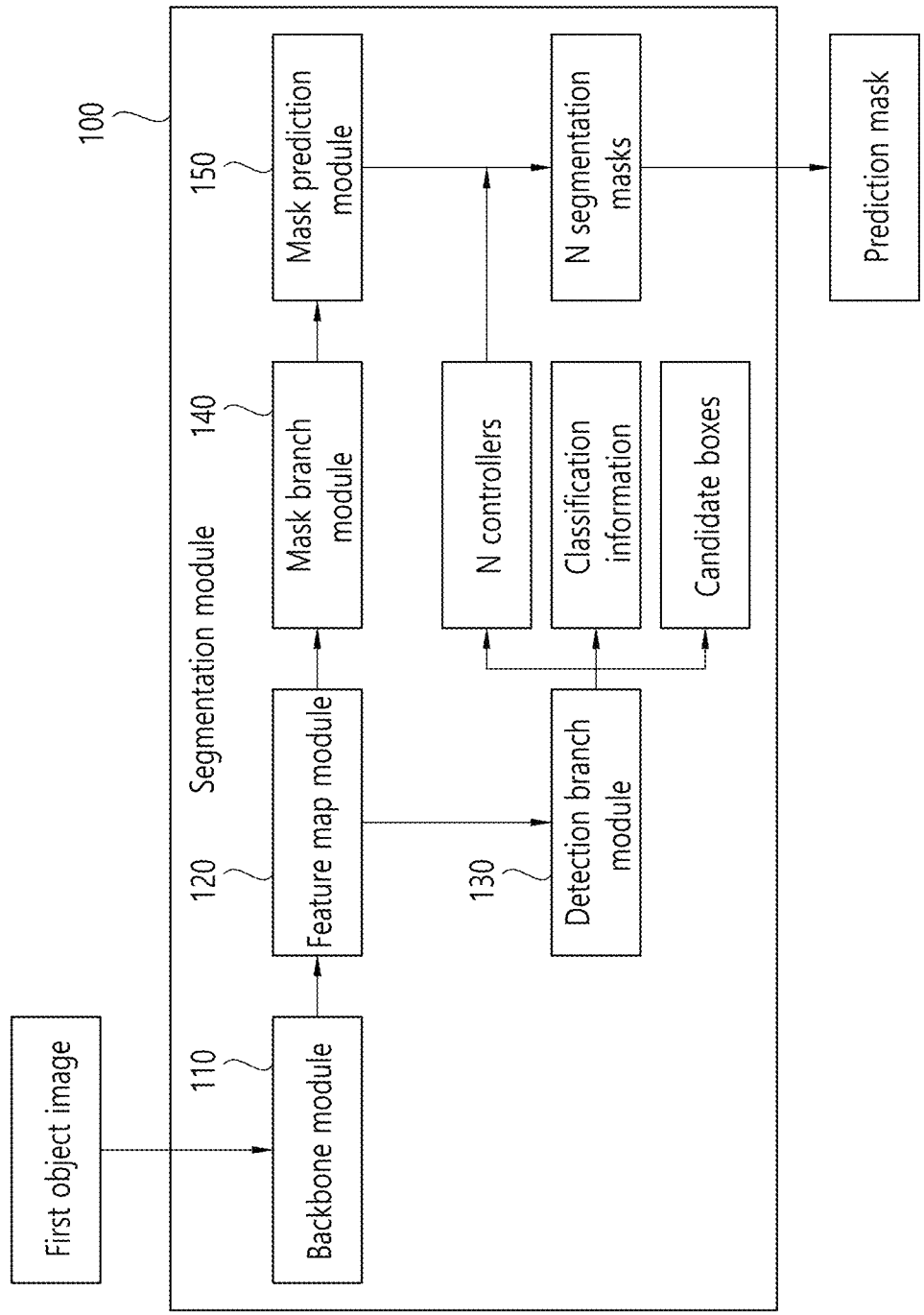

FIGS. 6 and 7 illustrate a segmentation model in an apparatus for auto segmentation according to one embodiment of the present disclosure.

As shown in FIGS. 6 and 7, a segmentation model includes a backbone module 110, a feature map module 120, a detection branch module 130, a mask branch module 140, and a mask prediction module 150 for segmentation through a mask branch. According to embodiments, the backbone module 110, the feature map module 120, the detection branch module 130, the mask branch module 140, and the mask prediction module 150 included in the segmentation model may be implemented in a processor.

FIG. 7 illustrates a block diagram of the segmentation model of FIG. 6.

In what follows, specific operations of the segmentation model according to one embodiment of the present disclosure of FIGS. 6 and 7 will be described.

First, the segmentation model structure will be described. The segmentation model is a model that extracts object regions from an object image. Since the values of the surrounding pixels are very important, the segmentation model may accurately extract the object region by utilizing the values of the surrounding pixels rather than using only a simple segmentation model. Here, the object region may include a bounding box or segmentation.

When an object to be identified is present in the object region of an object image through a segmentation model, the apparatus for auto segmentation distinguishes the object from the background and performs a segmentation operation. Here, it is assumed that the similarity between the object and the background will be small in terms of color level. Based on the assumption, the apparatus for auto segmentation learns segmentation only with object region labels by utilizing color similarity. The part for obtaining the corresponding segmentation represents the part for outputting an instance mask through the mask branch in FIG. 6.

In what follows, a segmentation operation through the mask branch will be described in detail.

First, the apparatus for auto segmentation receives a first object image including an object.

The backbone module 110 receives the first object image and extracts semantic information on the first object image received through C3, C4, and C5.

Then, the feature map module 120 mutually complements the semantic information extracted by the backbone module 110 and extracts feature maps through P3 to P7, which contain more feature map information than the semantic information. Here, the feature maps extracted from P3, P4, P5, P6, and P7 extracted from the feature map module 120 pass through the detection branch module 130 shared for all layers.

The detection branch module 130 determines the position and type of an object in the input image and extracts a controller, classification information, and candidate boxes for extracting an object region through a head. For example, the object type may be extracted as classification $P_{x,y}$, and the controller may be extracted as controller (generating filters $\theta_{x,y}$).

Here, bounding boxes indicating the same object may be removed using a non-maximum suppression (NMS) method. The non-maximum suppression (NMS) method is an algorithm for assigning one bounding box to one object by using the Intersection over Union (IoU) metric that indicates the percent overlap between object regions predicted by non-maximum suppression and the probability that each bounding box predicted by the segmentation model contains an object.

The mask branch module 140 adds relative coordinate values to the feature map that has passed through the mask branch separately from the detection branch module 130.

Next, the mask prediction module 150 performs segmentation by using the controller of each object region calculated through the detection branch module 130 as a parameter and predicts N segmentation masks. The mask prediction module 150 outputs the prediction masks. The prediction masks may be used for learning the segmentation model.

On the other hand, the object to be classified may be given thousands or tens of thousands of names depending on from which point of view the object is seen. Therefore, the apparatus for auto segmentation may classify all pixels in the object image so that the part corresponding to the object is designated as 1 and the background as 0 in the object image, thereby determining whether a pixel belongs to one of the objects to be trained or background.

Figure 8:
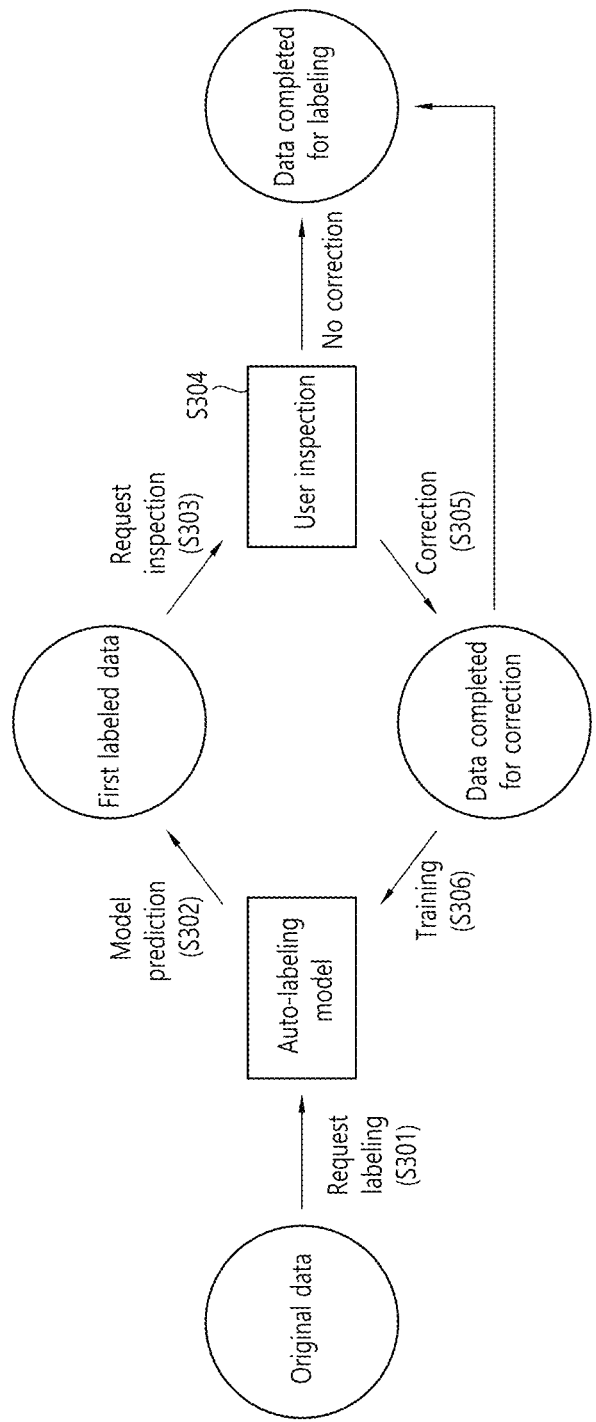
FIG. 8 illustrates an operation of auto-labeling using user inspection according to one embodiment of the present disclosure.

FIG. 8 illustrates an operation of auto-labeling using user inspection according to one embodiment of the present disclosure.

In the S301 step, the apparatus for auto segmentation is requested to label the original data.

In the S302 step, the apparatus for auto segmentation performs auto-labeling through model prediction by the pre-learned segmentation model on the original data requested for labeling. At this time, the segmentation model classifies an object and a background in the object image. The apparatus for auto segmentation may extract only the part classified as an object after separating the object from the background and input the part classified as an object into the multimodal model. The apparatus for auto segmentation may secure better labeling performance by using the multimodal model and the menu information on which objects roughly exist.

In the S303 step, the apparatus for auto segmentation requests user inspection for the first labeled data.

In the S304 step, the user inspects the first labeled data requested for inspection. At this time, those data without the need for correction of labeling from the user inspection result are output as data completed for labeling.

In the S305 step, the user corrects a labeling result when correction is needed for the user inspection result.

In the S306 step, the apparatus for auto segmentation may improve the performance of the pre-learned segmentation model by adding the data completed for correction to the learning process of the pre-learned segmentation model. In what follows, the S302 to S306 steps may be repeatedly performed to improve the performance of the segmentation model.

As described above, since the segmentation model according to one embodiment of the present disclosure utilizes not only the object images labeled with bounding boxes but also segmentation data for learning, performance may gradually improve. As time progresses, although it may not be possible to complete labeling 100% based only on the model, the cost of user inspection is reduced.

Figure 9:
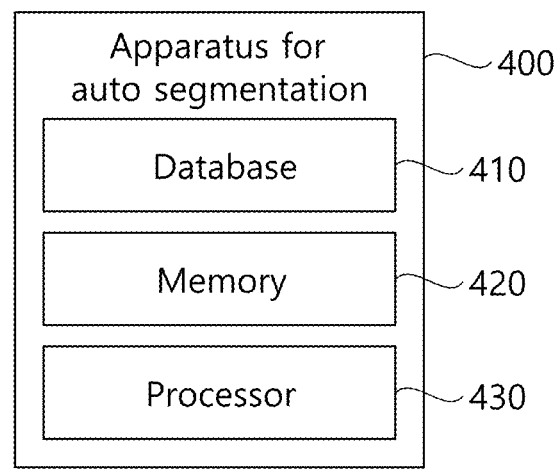
FIG. 9 illustrates a structure of an apparatus for auto segmentation using a bounding box according to one embodiment of the present disclosure.

FIG. 9 illustrates a structure of an apparatus for auto segmentation using a bounding box according to one embodiment of the present disclosure.

As shown in FIG. 9, the apparatus 400 for auto segmentation using a bounding box according to one embodiment of the present disclosure includes a database 410, a memory 420, and a processor 430. However, not all of the constituting elements shown in the figure are essential constituting elements. The apparatus 400 for auto segmentation according to one embodiment of the present disclosure may be implemented using a larger or smaller number of constituting elements than shown in the figure.

In what follows, a detailed structure and operation of each constituting element of the apparatus 400 for auto segmentation according to one embodiment of the present disclosure of FIG. 9 will be described.

The database 410 stores a first object image including an object labeled with a bounding box, which is a pre-learning target.

The memory 420 stores one or more programs related to auto segmentation using a bounding box.

The processor 430 may receive a first object image including an object labeled with a bounding box, which is a pre-learning target, learn a segmentation model by classifying an object and a background from the bounding box of the received first object image, and segment an object from a second object image, which is an identification target, using the learned segmentation model.

According to embodiments, the processor 430 may classify an object and a background using a color similarity map in a bounding box of the received first object image and learn the segmentation model through the classification of the object and the background.

According to embodiments, the processor 430 may learn the segmentation model by determining whether a pixel located in the bounding box of the received first object image belongs to one of objects to be trained or the background.

According to embodiments, the processor 430 may calculate a mask loss by summing a first loss calculated by using a mask and a bounding box predicted in the first object image and a second loss calculated by using a mask predicted in the first object image and a color similarity map between individual pixels and their neighboring pixels within the bounding box and learn the segmentation model using the calculated mask loss.

According to embodiments, the processor 430 may calculate a first loss so that the prediction mask is restricted to stay within the bounding box.

According to embodiments, the processor 430 may calculate a second loss so that an area occupied by the prediction mask contains the minimum of a background area and the maximum of an object area.

According to embodiments, the processor 430 may perform auto-labeling in a manner of re-training through user inspection for a bounding box exceeding a preset prediction error value.

According to embodiments, the processor 430 may identify an object from the second object image, which is an identification target, using the learned segmentation model and a pre-learned multimodal model.

Meanwhile, when the processor executes a method, a non-transitory computer-readable storage medium may be provided for storing instructions used by the processor to execute the method, the method comprising receiving a first object image including an object labeled with a bounding box, which is a pre-learning target; learning a segmentation model by classifying an object and a background from the bounding box of the received first object image; and segmenting an object from a second object image, which is an identification target, using the learned segmentation model.

Meanwhile, according to one embodiment of the present disclosure, various embodiments described above may be implemented by software including instructions stored in a machine (e.g., a computer) readable storage media. The machine is an apparatus capable of calling stored instructions from the storage medium and operating according to the instructions called, which may include an electronic device (for example, an electronic device (A)) according to the disclosed embodiments. When an instruction is executed by the processor, the processor may perform the function corresponding to the instruction directly or by using other constituting elements under the control of the processor. The instruction may include code generated or executed by a compiler or an interpreter. The machine-readable storage medium may be provided in the form of a non-transitory storage medium. Here, the term 'non-transitory' only indicates that the storage medium does not include a signal and is tangible but does not distinguish whether data are stored semi-permanently or temporarily.

Also, according to one embodiment of the present disclosure, the method according to various embodiments described above may be provided by being included in a computer program product. The computer program product may be traded between sellers and buyers as a commodity. The computer program product may be distributed in the form of a machine-readable storage medium (for example, a Compact Disc Read Only Memory (CD-ROM)) or online through an application store (for example, Play Store™). In the case of online distribution, at least part of the computer program product may be at least stored temporarily or generated temporarily in a server of the manufacturer, a server of the application store, or a storage medium such as a memory of a relay server.

Also, according to one embodiment of the present disclosure, various embodiments described above may be implemented in a recording medium that may be read by a computer or a machine similar thereto by using software, hardware, or a combination of both. In some cases, the embodiments of the present disclosure may be implemented within a processor itself. In the case of software implementation, the embodiments such as procedures and functions according to the present disclosure may be implemented by separate software modules. Each of the software modules may perform one or more functions and operations according to the present disclosure.

Meanwhile, the computer instructions for executing processing operations of the machine according to various embodiments described above may be stored in a non-transitory computer-readable medium. When executed by a processor of a specific machine, the computer instructions stored in the non-transitory computer-readable medium instruction the specific machine to perform processing operations for an apparatus according to the various embodiments described above. The non-transitory computer-readable medium refers to a medium that stores data semi-permanently and that may be read by a machine, rather than a medium that stores data for a short time period such as a register, a cache, and a memory. Specific examples of the non-transitory computer-readable medium include a CD, a DVD, a hard disk, a Bluray disk, a USB memory, a memory card, and a ROM.

Also, each of the constituting elements (for example, a module or a program) according to the various embodiments of the present disclosure may be composed of a single or multiple entities; and part of the corresponding sub-elements described above may be omitted, or another sub-element may be further included in the various embodiments. Alternatively or additionally, part of the constituting elements (for example, a module or a program) may be integrated into a single entity, and the functions executed by the respective constituting elements prior to the integration may be performed in the same manner or in a similar manner. The operations executed by a module, a program, or another constituting element according to the various embodiments may be performed in a sequential, parallel, or heuristic manner; or at least part of the operations may be performed in a different order or omitted, or another operation may be added to the operations.

Throughout the document, preferred embodiments of the present disclosure have been described with reference to appended drawings; however, the present disclosure is not limited to the embodiments above. Rather, it should be noted that various modifications of the present disclosure may be made by those skilled in the art to which the present disclosure belongs without leaving the technical scope of the present disclosure defined by the appended claims, and these modifications should not be understood individually from the technical principles or perspectives of the present disclosure.

What is claimed is:

1. A method for auto segmentation executed by an apparatus for auto segmentation, the method comprising:
    receiving a first object image including an object labeled with a bounding box, which is a pre-learning target;
    learning a segmentation model by classifying an object and a background from the bounding box of the received first object image; and
    segmenting an object from a second object image, which is an identification target, using the learned segmentation model,
    wherein the learning a segmentation model calculates a mask loss by summing a first loss calculated by using a mask and a bounding box predicted in the first object image and a second loss calculated by using a mask predicted in the first object image and a color similarity map between individual pixels and their neighboring pixels within the bounding box and learns the segmentation model using the calculated mask loss.

2. The method of claim 1, wherein the learning a segmentation model classifies an object and a background using a color similarity map in a bounding box of the received first object image and learns the segmentation model through the classification of the object and the background.

3. The method of claim 1, wherein the learning a segmentation model learns the segmentation model by determining whether a pixel located in the bounding box of the received first object image belongs to one of objects to be trained or the background.

4. The method of claim 1, wherein the learning a segmentation model calculates a first loss so that the prediction mask is restricted to stay within the bounding box.

5. The method of claim 1, wherein the learning a segmentation model calculates a second loss so that an area occupied by the prediction mask contains the minimum of a background area and the maximum of an object area.

6. The method of claim 1, further including:
    performing auto-labeling in a manner of re-training through user inspection for a bounding box exceeding a preset prediction error value.

7. The method of claim 1, wherein the identifying an object from a second object image identifies an object from the second object image, which is an identification target, using the learned segmentation model and a pre-learned multimodal model.

8. An apparatus for auto segmentation using a bounding box comprising:
    a memory storing one or more programs; and
    a processor executing the stored one or more programs, wherein the processor is configured to:
    receive a first object image including an object labeled with a bounding box, which is a pre-learning target,
    learn a segmentation model by classifying an object and a background from the bounding box of the received first object image, and
    segment an object from a second object image, which is an identification target, using the learned segmentation model,
    wherein the processor calculates a mask loss by summing a first loss calculated by using a mask and a bounding box predicted in the first object image and a second loss calculated by using a mask predicted in the first object image and a color similarity map between individual pixels and their neighboring pixels within the bounding box and learn the segmentation model using the calculated mask loss.

9. The apparatus of claim 8, wherein the processor classifies an object and a background using a color similarity map in a bounding box of the received first object image and learns the segmentation model through the classification of the object and the background.

10. The apparatus of claim 8, wherein the processor learns the segmentation model by determining whether a pixel located in the bounding box of the received first object image belongs to one of objects to be trained or the background.

11. The apparatus of claim 8, wherein the processor calculates a first loss so that the prediction mask is restricted to stay within the bounding box.

12. The apparatus of claim 8, wherein the processor calculates a second loss so that an area occupied by the prediction mask contains the minimum of a background area and the maximum of an object area.

13. The apparatus of claim 8, wherein the processor performs auto-labeling in a manner of re-training through user inspection for a bounding box exceeding a preset prediction error value.

14. The apparatus of claim 8, wherein the processor identifies an object from the second object image, which is an identification target, using the learned segmentation model and a pre-learned multimodal model.

15. The apparatus of claim 8 comprising a database storing the first object image including the object labeled with the bounding box, which is the pre-learning target, wherein the processor is configured to receive the first object image from the database.

* * * * *